United States Patent [19]

Kikuchi

[11] Patent Number: 5,119,259
[45] Date of Patent: Jun. 2, 1992

[54] MAGNETIC DISK
[75] Inventor: Masaki Kikuchi, Kanagawa, Japan
[73] Assignee: Fuji Photo Film Co., Ltd., Kanagawa, Japan
[21] Appl. No.: 622,576
[22] Filed: Dec. 5, 1990

[30] Foreign Application Priority Data
Dec. 6, 1989 [JP] Japan ................. 1-317164

[51] Int. Cl.$^5$ .............................................. G11B 5/82
[52] U.S. Cl. ................................................... 360/135
[58] Field of Search ................ 360/135, 133; 369/280, 369/287; 346/137; 428/65, 694; 29/448

[56] References Cited
U.S. PATENT DOCUMENTS

| | | | |
|---|---|---|---|
| 4,812,939 | 3/1989 | Dishi ........................ | 360/135 |
| 4,835,647 | 5/1989 | Chernega et al. ........ | 360/135 |
| 4,887,178 | 12/1989 | McCracken et al. ..... | 360/135 |

FOREIGN PATENT DOCUMENTS 61-115239 6/1986 Japan ................. 360/135

Primary Examiner—Robert S. Tupper
Attorney, Agent, or Firm—Sughrue, Mion, Zinn, Macpeak & Seas

[57] ABSTRACT

A magnetic disk of the stretched surface type, in which a substrate is formed at least two bases having opposing warp characteristics so as to avoid adverse deformation effects. Non-metallic materials, which are less expensive than metallic materials such as aluminum, preferably are used for the substrate, with the thermal expansion coefficient of the substrate being approximately that of the arm on which a magnetic head is mounted. The bases may be adhered by a hot-melt adhesive or a radiation-curable adhesive.

9 Claims, 1 Drawing Sheet

MAGNETIC DISK

BACKGROUND OF THE INVENTION

The present invention relates to a magnetic recording disk constituted by a flexible magnetic sheet having a magnetic layer that is stretched across a disk-shaped substrate having a central bore and a broad annular recess in the surface. More particularly, the invention relates to a magnetic disk having a more rigid substrate.

Magnetic disks, such as floppy disks and rigid magnetic disks, are used in a broad range of applications including computers, office automation (OA) equipment and electronic devices. Floppy disks are manufactured by stamping out disks of a flexible magnetic sheet having a magnetic layer on a flexible nonmagnetic support, and placing the stamped-out disks within a comparatively soft jacket or a highly rigid case for use as external memories. Rigid magnetic disks, which commonly are used as built-in memories within equipment, are manufactured by forming a magnetic layer on a rigid substrate made of a less flexible material such as aluminum.

One of the requirements of modern floppy disks and rigid magnetic disks is increased recording density and capacity. This need can be met in one way by increasing the density of recording tracks on the surface of the disks.

Floppy disks which use flexible supports made of synthetic resins exhibit particularly high endurance when rotated in sliding contact with a magnetic head. Further, the magnetic layer used in floppy disks is highly amenable to surface treatments, so the center-line-average roughness (Ra) of the recording surface of the magnetic layer can be reduced to a very small value. Therefore, so far as the surface property of the magnetic layer is concerned, floppy disks theoretically should be compatible with the requirement for increased recording density. However, if the recording capacity and, hence, the recording density is to be increased by forming more tracks along the periphery, the support, which is made of a synthetic material, will experience substantial expansion or contraction because of temperature changes. Such dimensional change often has caused tracking errors, or positional offsets from the magnetic head.

On the other hand, rigid magnetic disks which have a magnetic layer formed on a substrate that is comparatively rigid and has a low thermal expansion coefficient are less prone to tracking errors from expansion or contraction under varying temperatures. Hence, the aforementioned problem of floppy disks associated with tracking errors is alleviated considerably with rigid magnetic disks.

In the manufacture of rigid magnetic disks, the surface of a substrate typically made of aluminum is ground and polished to such a level that the spacing loss between the magnetic head and the magnetic disk is made sufficiently small to permit high-density recording. Only thereafter is a magnetic layer formed on the substrate. To perform magnetic recording and reproduction at high density, the surface of the magnetic disk preferably is as smooth as possible. However, with conventional techniques of surface treatment, it has been difficult to achieve a substrate surface that has a center-line-average roughness (Ra) below 0.1 $\mu$m. This has limited previous attempts to meet the requirement of rigid magnetic disks for higher recording density by improving the substrate surfaces.

Further, the substrate used as the support of the magnetic layer in rigid magnetic disks is not flexible. Thus, in the process of manufacturing rigid magnetic disks, a convenient method cannot be adopted in which the support wound onto a roll is unwound toward the subsequent step of forming a magnetic layer on the support. As a result, the manufacturing process has been inconvenient in that a magnetic layer cannot be continuously formed on a long support. Another problem associated with the lack of flexibility in the support is that, if the magnetic head accidentally contacts the magnetic layer during recording or reproduction (in either mode, such contact should not occur), a great impact will occur readily, potentially destroying the magnetic layer. This problem is particularly serious when one attempts to achieve further improvement in the density of magnetic recording and reproduction since it is required to reduce the spacing loss between the magnetic head and the magnetic layer, making the frequency of damage to the magnetic layer even higher.

With a view to solving the aforementioned problems, a new type of magnetic disk has been proposed. Called a stretched surface recording (SSR) disk, this new version of magnetic disk is constituted by a rigid substrate having a broad annular recess in the surface and a flexible magnetic sheet having a magnetic layer on the surface of a flexible nonmagnetic support that is stretched across said rigid substrate in such a way that it covers the annular recess while forming a space under the magnetic sheet as defined by the recess.

The recording surface of this new type of magnetic disk is flexible (i.e., it is formed as a flexible sheet), so that, even if the magnetic head accidentally contacts the recording surface of the magnetic layer, and even if high-density recording or reproduction is performed with the head being held in sliding contact with the magnetic layer (i.e., as if they were in mutual contact), the magnetic layer is less likely to be destroyed than would be the case for conventional rigid magnetic disks. Further, the advantageous features of floppy disks are retained, enabling the manufacture of magnetic disks having a good surface property and high endurance in rotation. More specifically, the annular recess in the surface of the rigid substrate provides a space under the magnetic sheet. Even if the magnetic sheet accidentally contacts the magnetic layer, the space permits the magnetic sheet to deform elastically, thereby exhibiting a cushioning effect to prevent the head from destroying the magnetic layer. In addition, the spacing loss between the magnetic layer and the magnetic head is reduced further to allow optimum sliding for high-density recording. Thus, the SSR disk may well be regarded as a magnetic disk that offers the inherent advantages of a floppy disk and a rigid magnetic disk.

General technical information on the SSR disk may be found in U.S. Pat. No. 4,573,097. As shown in FIG. 4, a magnetic layer 11 is formed by some suitable method on a flexible support 12 made of a synthetic resin. As shown in FIG. 3, the resulting magnetic sheet 2 is stretched across each side of a rigid substrate 3 having not only a central bore 9 but also an annular recess 8 that is formed in each of the top and bottom surfaces. The magnetic sheet 2 is stretched across the rigid substrate 3 in such a way as to cover the recesses 8.

The magnetic disk 1 in FIG. 3 is produced by a process that includes stamping out a predetermined shape of the magnetic sheet 2 and then bonding it onto a boss 6 and an annular upstanding rim 7 formed on either side of the rigid substrate 3, with the magnetic layer 11 facing upwardly. Thus, a space 5 is formed between the magnetic sheet 2 and the rigid substrate 3 that corresponds to the depth of the recess 8 on either side of the substrate 3. In bonding the magnetic sheet 2 onto the rigid substrate 3, it is necessary that the sheet 2 be stretched in such a way as to withstand compression as with the magnetic head. To meet this need, the magnetic sheet 2 usually is stretched with sufficient tension being applied to make it taut.

To maintain the tension applied to the magnetic sheet 2, the substrate 3 typically is made of strong metallic materials such as aluminum. However, metallic materials are very expensive and, furthermore, are not very easy to process. Under these circumstances, it may be proposed that polymeric materials that are not only low in material cost but which also permit efficient production of substrates be used as substitutes for aluminum.

However, in practice magnetic disks using substrates that are produced from polymeric materials are not rigid enough to insure prolonged maintenance of the tension applied to the magnetic sheet 2. Further, if the substrate is formed by injection molding, internal strains are likely to occur which will eventually lead to warpage or distortion of the substrate. During prolonged use, the tension applied to the magnetic sheet will cause a gradual increase in the deformation of the substrate. As a result, the magnetic disk will rotate erratically or unevenly, increasing the chance of deterioration in quality such as the inability to operate in close conformity to the magnetic head.

SUMMARY OF THE INVENTION

The present invention has been made under these circumstances, and has an object the provision of a magnetic disk that not only is inexpensive but also is capable of withstanding prolonged use to ensure high performance without experiencing any deformation.

This object of the present invention can be attained by a magnetic disk constituted by a flexible magnetic sheet having a magnetic layer on a nonmagnetic support and a disk-shaped rigid substrate having a central bore and a broad annular recess in the surface. The magnetic sheet is stretched across the substrate in such a way that the recess defines a space between the magnetic sheet and the substrate. The magnetic disk is characterized in that the rigid substrate is composed of at least two bases that are bonded together in the direction of the thickness of said substrate in such a way that the warp characteristics of one base cancel those of another.

DETAILED DESCRIPTION OF THE PREFERRED EMBODIMENT

An embodiment of the present invention is described below in detail with reference to the accompanying drawings.

Figure 1:
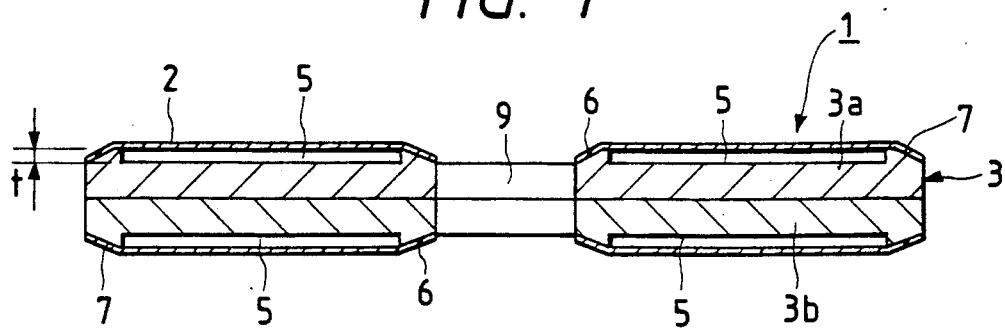
FIG. 1 is a section across the thickness of a magnetic disk according to one embodiment of the present invention.
Figure 2:
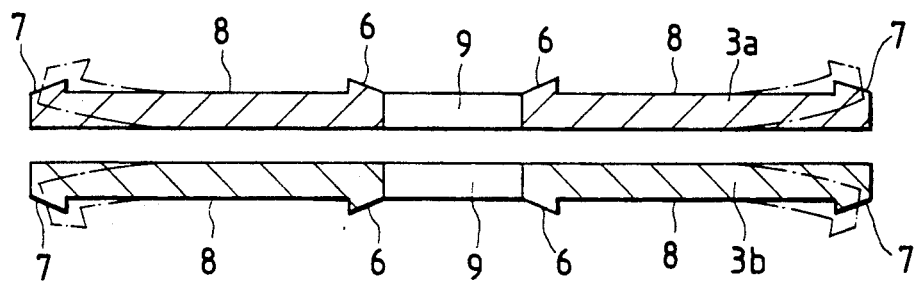
FIG. 2 is a cross section of two bases before they are bonded together to form the rigid substrate shown in FIG. 1.
Figure 3:
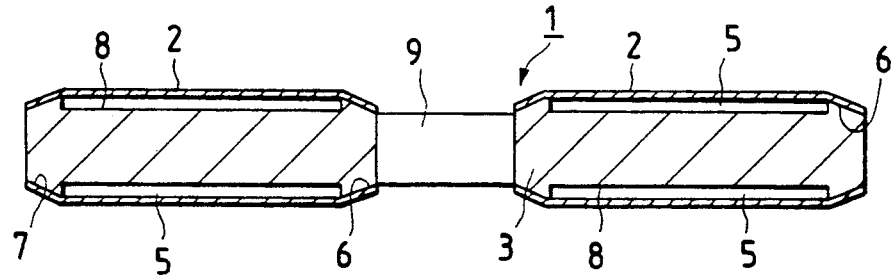
FIG. 3 is a section across the thickness of a conventional magnetic disk.

A magnetic disk 1 in FIG. 1 is constituted by a rigid substrate 3 made of a plastic resin that has a broad annular recess 8 formed in the surface of each of the top and bottom sides, and a magnetic sheet 2 that is bonded to a boss 6 and an annular upstanding rim 7 on either side of the substrate. A space 5 that corresponds to the depth of the recess 8 is formed on either side between the magnetic sheet 2 and the rigid substrate 3. The disk 1 also has a central bore 9 which accepts a disk-rotating shaft. As shown in FIG. 2, the rigid substrate 3 is composed of two polymeric bases 3a and 3b that are made of a plastic resin and which are bonded together in the direction of the thickness of the substrate.

The bases 3a and 3b can be bonded together with a heat-curable adhesive, a radiation (e.g. EB or UV) curable adhesive, a hot-melt adhesive, or some other suitable adhesive, a hot-melt adhesive being preferred. The bonding operation typically will comprise applying a hot-melt adhesive onto the side of each of separately formed bases 3a and 3b where no recesses are present, bonding the bases together, and heating them under pressure. In order to ensure an enhanced bonding effect, grooves or holes may be formed in the surface of the boss 6 or annular rim 7. The adhesive layer typically has a thickness of 1-100 $\mu$m, preferably 3-20 $\mu$m. To facilitate bonding, one or both of the mating surfaces may be subjected to a suitable physical surface treatment such as corona discharge, glow discharge or flame treatment.

The bases 3a and 3b are bonded together in such a way that the warp characteristics (which also can be called "deformation characteristics") of one base will cancel those of the other. In the case where the bases 3a and 3b are formed by injection molding, the shrinkage that occurs upon cooling the molten resin will cause the peripheral portions of bases 3a and 3b to deform in such a way that they warp in a direction away from the mating surfaces. At the same time, the flow of resin being injected or other phenomena will cause subtle changes in the above-described deformation depending on the position of gates.

With these elements of deformation being taken into account, one may bond the bases 3a and 3b together in such a way that the positions of gates on those bases will be symmetrical with respect to the mating surfaces. This is effective not only in preventing the occurrence of deformations by attaining balance between forces that cause warpage but also in allowing the inherent force of warpage in the bases 3a and 3b (i.e., the force of deformation that is indicated by long-and-short dashed lines in FIG. 2) to make them taut in such a way that they pull each other, with the mating surfaces being interposed, in a direction that is generally perpendicular to the substrate surface, so that the rigidity of the substrate 3 can be enhanced effectively. Further, the rigid substrate 3 is very cheap, since it can be produced in large quantities by injection molding.

Figure 4:
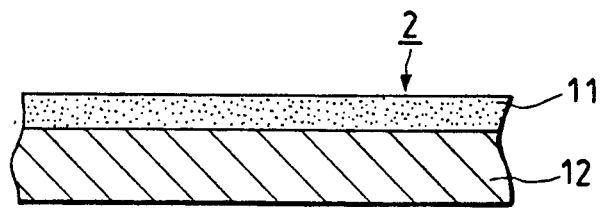
FIG. 4 is a cross section of a magnetic sheet.

The space 5 formed between the magnetic sheet 2 and the substrate 3 contributes enhanced durability to the magnetic layer 11 (see FIG. 4) by dissipating the frictional and compressive forces that develop in it upon contact with the magnetic head. In addition, this space is effective for performing high-density recording because the spacing between the magnetic layer 11 and the magnetic head can be made very small. Furthermore, for some unknown reason, the space 5 seems to reduce the adverse effects that can be caused on the fidelity of recording or reproduction by dust particles deposited on the magnetic layer 11. The depth (t) of the space 5 desirably is at least 0.1 mm. In the embodiment shown in FIGS. 1 and 2, the surfaces of the boss 6 and annular rim 7 are flat and inclined with respect to the recording/reproducing region of the substrate. However, if desired, those surfaces may be horizontal or curved with a suitable radius. The inside and outside diameters of the rigid substrate 3, as well as the size of the boss 6 and the annular rim 7 may be selected as appropriate for a specific object.

The rigid substrate 3 may be formed of metals or resins that incorporate fillers such as glass.

In order to prevent deformation that may occur during storage at elevated temperatures, the substrate 3 preferably is formed of heat-resistant crystalline polymers or non-crystalline polymers that have glass transition points not lower than 80° C. Specific examples of such polymers include polycarbonates, polyether imides, polyphenylene sulfides, polyimides, polysulfones, polyacrylates, polyether sulfones, polyether ether ketone, etc.

In order to reduce the expansion coefficient of the rigid substrate 3, metal oxides (e.g. $TiO_2$ and $SiO_2$), $BaSO_4$, glass fibers, etc. may be incorporated in amounts of 5-50 wt%.

The rigid substrate 3 used in the present invention generally has a thickness of 1-5 mm, and the magnetic sheet 2 to be stretched across the substrate typically has a thickness of 10-100 μm.

The arm of the magnetic head commonly is made of aluminum, so the thermal expansion coefficient of the rigid substrate 3 preferably is close to that of aluminum, which is $2.4 \times 10^{-5}/°$ C., and its hygroscopic expansion coefficient preferably is as small as possible.

The magnetic sheet 2 used in the present invention may be made of any of the materials that are commonly employed in floppy disks. The support 4 of the magnetic sheet 2 is selected from among nonmagnetic plastic films such as polyethylene terephthalate, polyethylene naphthalate and polyimide films, with a biaxially oriented polyethylene terephthalate (PET) film being preferred. A particularly preferred support is a biaxially oriented PET film which, when provided with a magnetic layer and after heat treatment at ca. 70° C. for 48 h, shrinks by no more than 0.2%, with the difference between the shrinkage in a longitudinal direction and that in a transverse direction being no more than 0.1%, preferably no more than 0.05%.

The support 12 (see FIG. 4) of the magnetic sheet 2 preferably is such that at least the surface on which the magnetic layer is to be formed has a center-line-average roughness (Ra) of no more than 0.1 μm, with a cutoff value of 0.08. Using such a support, the density of recording with the magnetic disk as the final product can be enhanced. The magnetic layer 11 may be formed on the support 12 by coating a magnetic iron oxide powder or a ferromagnetic alloy powder together with a binder and other necessary additives. Other methods that can be employed to form the magnetic layer 11 include vapor deposition techniques (e.g. vacuum evaporation, sputtering and ion plating) and chemical plating techniques.

In the embodiment described above, the rigid substrate 3 is formed by injection molding. However, this is not always the case in the present invention, and the substrate may be formed from a sheet of resin material. In this alternative case, the resin materials to be bonded together may be oriented to create specific deformation characteristics that can be utilized to achieve effective bonding of the bases in such a way that the rigidity of the substrate is substantially improved while it is protected against unwanted deformation.

In the embodiment, the rigid substrate 3 is composed of two bases that are bonded together. Again, this is not always the case in the present invention, and three or more bases may be bonded together to form the rigid substrate.

As described in the foregoing, the inventive magnetic disk is constituted by a disk-shaped rigid substrate and a flexible magnetic sheet that has a magnetic layer on a nonmagnetic support and which is stretched across the rigid substrate in such a way as to form a space under the magnetic sheet. The rigid substrate is composed of at least two bases that are bonded together in the direction of the thickness of the substrate in such a way that the warp characteristics of one base cancel those of another. Therefore, if the bases are to be formed by injection molding, one may predict not only the deformation that will occur in a resin on account of its shrinkage upon cooling but also the deformation characteristics which are dependent on the position of gates. If the bases are bonded together on the basis of the predicted data in such a way that substantially the same amount of forces of deformation will develop in opposite directions, the forces of warpage in the bases will balance each other to prevent deformation in the resulting substrate. Further, a tensioned state can be created in such a way that the bases bonded together will pull each other, with the mating surfaces interposed therebetween, whereby the rigidity of the substrate can be enhanced effectively. In addition, the rigid substrate which is made of a synthetic resin can be process and manufactured efficiently and hence at low cost.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:
1. A magnetic disk comprising:
   a flexible magnetic sheet having a magnetic layer on a nonmagnetic support; and
   a disk-shaped rigid substrate having a central bore and a broad annular recess in the surface, said magnetic sheet being stretched across said substrate in such a way that said recess defines a space between said magnetic sheet and said substrate,
   wherein said rigid substrate comprises at least two bases that are bonded together in the direction of a thickness of said substrate in such a way that warp characteristics of one of said at least two bases cancel those of another of said at least two bases.
2. A magnetic disk as claimed in claim 1, further comprising an adhesive layer between 1-100 μm thick for bonding said at least two bases together.
3. A magnetic disk as claimed in claim 2, wherein said adhesive layer comprises a hot-melt adhesive.

4. A magnetic disk as claimed in claim 2, wherein said adhesive layer is 3–20 μm thick.

5. A magnetic disk as claimed in claim 2, wherein said adhesive layer comprises a radiation curable adhesive.

6. A magnetic disk as claimed in claim 1, wherein each of said at least two bases has a space formed therein so as to provide a separation between said support and said at least two bases.

7. A magnetic disk as claimed in claim 6, wherein said space is at least 0.1 mm deep.

8. A magnetic disk as claimed in claim 1, wherein said at least two bases comprise injection molded material.

9. A magnetic disk as claimed in claim 1, wherein said at least two bases comprise resin material.

* * * * *